United States Patent
Schoeneck

(10) Patent No.: US 6,672,539 B1
(45) Date of Patent: Jan. 6, 2004

(54) POWER GENERATION SYSTEM

(76) Inventor: Stephen L. Schoeneck, 3315 Foxridge Cir., Tampa, FL (US) 33618

( * ) Notice: Subject to any disclaimer, the term of this patent is extended or adjusted under 35 U.S.C. 154(b) by 0 days.

(21) Appl. No.: 10/231,703

(22) Filed: Aug. 30, 2002

(51) Int. Cl.$^7$ .............................................. B64C 39/06
(52) U.S. Cl. ...................... 244/12.2; 244/23 C; 244/62
(58) Field of Search ................... 244/10, 12.1, 12.2, 244/12.6, 15, 21, 23 R, 23 C, 62, 73 R, 73 C

(56) References Cited

U.S. PATENT DOCUMENTS

| | | | | |
|---|---|---|---|---|
| 3,067,967 A | * | 12/1962 | Barr | 244/12.2 |
| 3,224,711 A | * | 12/1965 | Warren et al. | 244/23 C |
| 3,410,507 A | * | 11/1968 | Moller | 244/23 C |
| 5,102,066 A | * | 4/1992 | Daniel | 244/12.2 |
| 5,178,344 A | * | 1/1993 | Dlouhy | 244/12.2 |
| 6,073,881 A | * | 6/2000 | Chen | 244/23 C |
| 6,371,406 B1 | * | 4/2002 | Corcoran | 244/12.2 |

* cited by examiner

*Primary Examiner*—Michael J. Carone
*Assistant Examiner*—Gabriel S. Sukman
(74) *Attorney, Agent, or Firm*—Edward P. Dutkiewicz

(57) ABSTRACT

A power generation system comprises an internal housing. The housing has a top portion, a bottom portion and a peripheral sidewall. An external housing is provided. The housing is coupled to and receives the internal housing. The housing has an upper lip, a lower lip and a smooth outer edge. The upper lip is spaced from the internal housing to allow the flow of air into the external housing. A rotary pump is comprised of an upper washer and a lower washer. Fins are provided between the washers. The washers form upper and lower surfaces. Fins are coupled to both the upper and lower washers. Each fin is curved such that when rotated the rotary pump draws air into the external housing from the upper lip and pushes it past the lower lip and out of the external housing to life the system.

8 Claims, 6 Drawing Sheets

POWER GENERATION SYSTEM

BACKGROUND OF THE INVENTION

1. Field of the Invention

The present invention relates to a power generation system and more particularly pertains to flying in a saucer shaped device through the use of a rotary pump.

2. Description of the Prior Art

The use of power generation systems of known designs and configurations is known in the prior art. More specifically, power generation systems of known designs and configurations previously devised and utilized for the purpose of flying in a saucer shaped device through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 2,939,648 to Fleissner discloses a rotating jet aircraft with lifting disc. U.S. Pat. No. 3,123,320 to Slaughter discloses a vertical rise aircraft having a centrifugal blower rotor. U.S. Pat. No. 5,039,031 to Valverde discloses an aircraft having a ring-like turbo blade system. U.S. Pat. No. 3,243,146 to Clover discloses a vertical-takeoff-landing aircraft. U.S. Pat. No. 4,370,824 to Resnicow discloses an aerial device. U.S. Pat. No. 3,572,613 to Porter discloses a circular wing aircraft. Finally, U.S. Pat. No. 5,856,719 to De Armas discloses an electromagnetic-coupled/levitated apparatus.

While these devices fulfill their respective, particular objectives and requirements, the aforementioned patents do not describe a power generation system that allows flying in a saucer shaped device through the use of a rotary pump.

In this respect, the power generation system according to the present invention substantially departs from the conventional concepts and designs of the prior art, and in doing so provides an apparatus primarily developed for the purpose of flying in a saucer shaped device through the use of a rotary pump.

Therefore, it can be appreciated that there exists a continuing need for a new and improved power generation system which can be used for flying in a saucer shaped device through the use of a rotary pump. In this regard, the present invention substantially fulfills this need.

SUMMARY OF THE INVENTION

In view of the foregoing disadvantages inherent in the known types of power generation systems of known designs and configurations now present in the prior art, the present invention provides an improved power generation system. As such, the general purpose of the present invention, which will be described subsequently in greater detail, is to provide a new and improved power generation system and method which has all the advantages of the prior art and none of the disadvantages.

To attain this, the present invention essentially comprises an internal housing. The housing is provided in a generally cylindrical configuration. The housing has a top portion. The housing has a bottom portion. The housing further has a peripheral sidewall between the top and bottom portions. The internal housing is adapted to carry cargo and passengers. An external housing is provided next. The housing is provided in a generally torus shape. The housing is coupled to and receives the internal housing. The housing has an upper lip. The housing also a lower lip. The housing further has a smooth outer edge. The upper lip is spaced from the internal housing to allow the flow of air into the external housing. The lower surface has a plurality of bearings. The bearings are spaced equally around the lower surface. The bearings are adapted to facilitate the expulsion of air from the external housing in a radial direction. Also provided is a rotary pump. The rotary pump comprises an upper washer, a lower washer and a plurality of fins between the upper and lower washers. The upper washer forms a top surface. The lower washer is a bottom surface. The lower washer is adapted to rotatably rest upon the bearings of the external housing. The fins are coupled perpendicular to both the upper and lower washers. Each fin is curved from the center such that when rotated the rotary pump draws air into the external housing from the upper lip and pushes it past the lower lip and out of the external housing to lift the system. Further provided is a plurality of driving mechanisms. The driving mechanisms are positioned around the peripheral sidewall of the internal housing. Each driving mechanism includes a motor and wheel assembly. The wheel assembly extends into the external housing such that the wheel contacts the top surface of the rotary pump providing rotary propulsion to the rotary pump. Provided last is a plurality of wind directing baffles. The baffles are coupled to the internal housing and adapted to control the direction of air flow.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved power generation system which has all of the advantages of the prior art power generation systems of known designs and configurations and none of the disadvantages.

It is another object of the present invention to provide a new and improved power generation system which may be easily and efficiently manufactured and marketed.

It is further an object of the present invention to provide a new and improved power generation system which is of durable and reliable constructions.

An even further object of the present invention is to provide a new and improved power generation system which is susceptible of a low cost of manufacture with regard to both materials and labor, and which accordingly is then susceptible of low prices of sale to the consuming public, thereby making such power generation system economically-available to the buying public.

Even still another object of the present invention is to provide a power generation system for flying in a saucer shaped device through the use of a rotary pump.

Lastly, it is an object of the present invention to provide a new and improved power generation system comprises an internal housing. The housing has a top portion, a bottom portion and a peripheral sidewall. An external housing is provided. The housing is coupled to and receives the internal housing. The housing has an upper lip, a lower lip and a smooth outer edge. The upper lip is spaced from the internal housing to allow the flow of air into the external housing. A rotary pump is comprised of an upper washer and a lower washer. Fins are provided between the washers. The washers form upper and lower surfaces. Fins are coupled to both the upper and lower washers. Each fin is curved such that when rotated the rotary pump draws air into the external housing from the upper lip and pushes it past the lower lip and out of the external housing to life the system.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
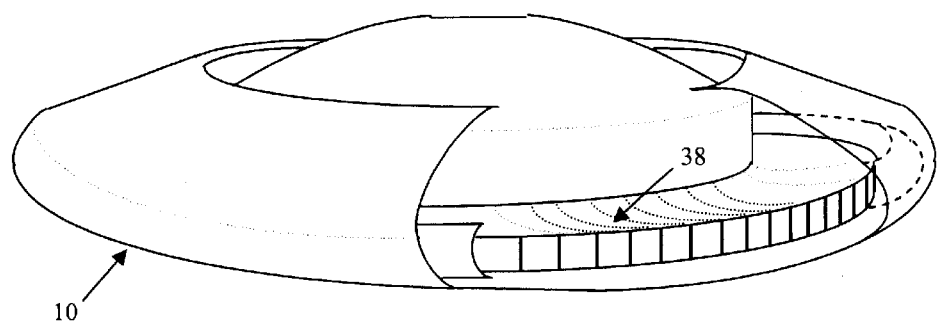
FIG. 1 is a perspective illustration of a saucer shaped device operable through the power generation system of the present invention with parts broken away to show certain internal constructions.

With reference now to the drawings, and in particular to FIG. 1 thereof, the preferred embodiment of the new and improved power generation system embodying the principles and concepts of the present invention and generally designated by the reference numeral 10 will be described.

The present invention, the power generation system 10 is comprised of a plurality of components. Such components in their broadest context include an internal housing, an external housing, and a rotary pump. Such components are individually configured and correlated with respect to each other so as to attain the desired objective.

First provided is an internal housing 12. The housing is provided in a generally cylindrical configuration. The housing has a top portion 14. The housing has a bottom portion 16. The housing further has a peripheral sidewall 18 between the top and bottom portions. The internal housing is adapted to carry cargo and passengers.

An external housing 20 is provided next. The housing is provided in a generally torus shape. The housing is coupled to and receives the internal housing. The housing has an upper lip 22. The housing also a lower lip 24. The housing further has a smooth outer edge 26. The upper lip is spaced from the internal housing to allow the flow of air into the external housing.

Also provided is a rotor pump 30. The rotor pump comprises an upper washer 32, a lower washer 34 with is curved exterior outer rim and a plurality of fins 38 between the upper and lower washers. Note FIG. 1. The upper washer forms a top surface. The lower washer is a bottom surface. The fins are coupled perpendicular to both the upper and lower washers. Each fin is curved from the center such that when rotated the rotary pump draws air into the external housing from the upper lip and pushes it past the lower lip and out of the external housing to lift the system. The fins and washers form draft pipes 35 with input ends 37 and output ends 39.

Further provided is a plurality of driving mechanisms. The driving mechanisms are positioned around the peripheral sidewall of the internal housing. Each driving mechanism includes a motor 40, transmission 42 and wheel 44, which together form a wheel assembly. The wheel assembly extends into the external housing such that the wheel contacts the top surface of the rotary pump providing rotary propulsion to the rotary pump.

Provided last is a plurality of wind directing baffles 46 The baffles are coupled to the internal housing and adapted to control the direction of air flow.

Rotor Pump, Surface and Shroud—Described herein is an aircraft, and possibly a spacecraft, with vertical takeoff and landing capabilities. The "fuel" for propulsion is the surrounding ambient air or water. Hereafter the surrounding air or water or the minute particles in outer space will be referred to as "fluid" or "the fluid".

Figure 2:
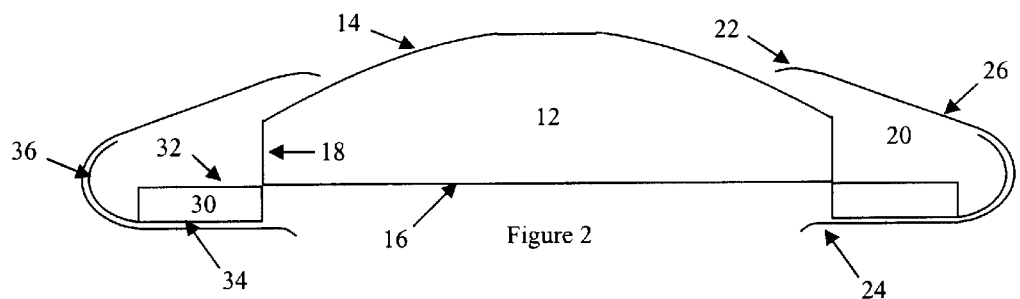
FIG. 2 is a cross sectional view taken radially through the system of FIG. 1.
Figure 3:
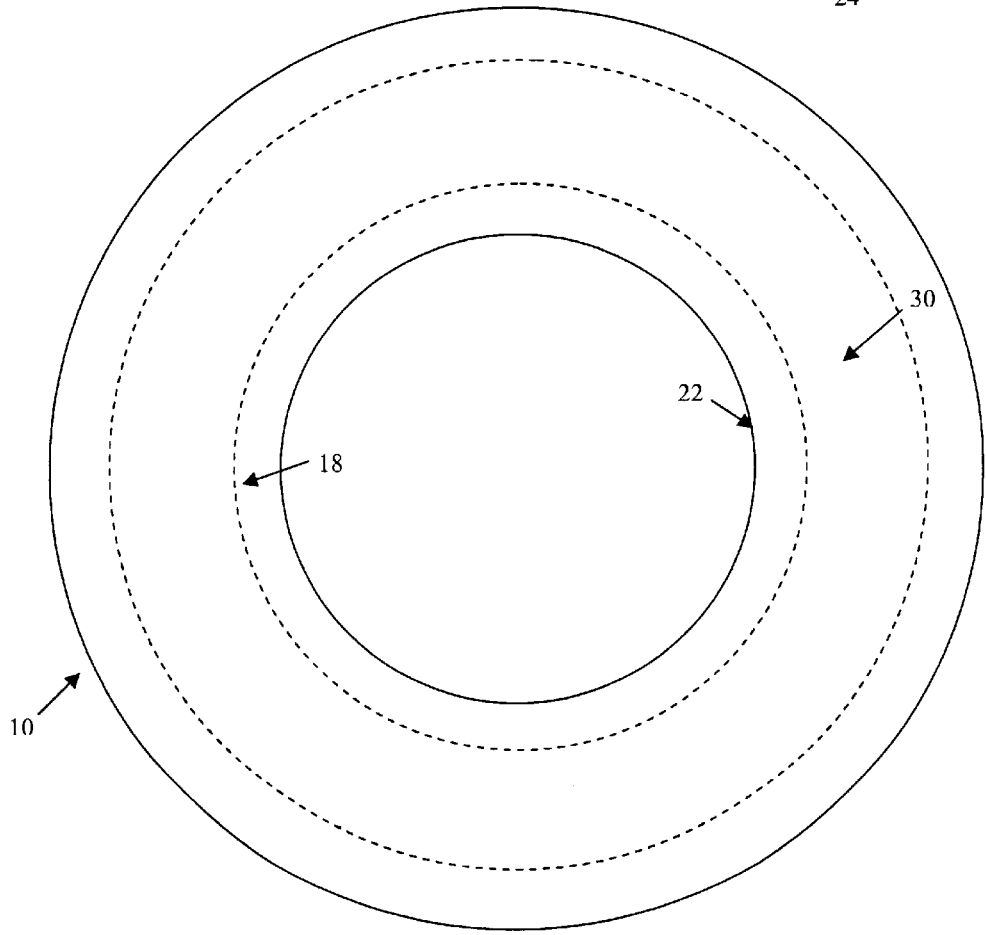
FIG. 3 is a top elevational view of the system shown in FIGS. 1 and 2.

A profile view of the main body, FIG. 2 shows the upper surface is dome shaped while the bottom surface is flat. A top view of the craft, FIG. 3, shows that the exterior looks like two concentric circles. The outer circle is really a donut shaped Shroud that is attached to the circumference of the main body. Enclosed within the Shroud and extending below the bottom surface of the main body there is a centripetal rotor pump, the elusive Tesla Turbine for flight.

Figure 4:
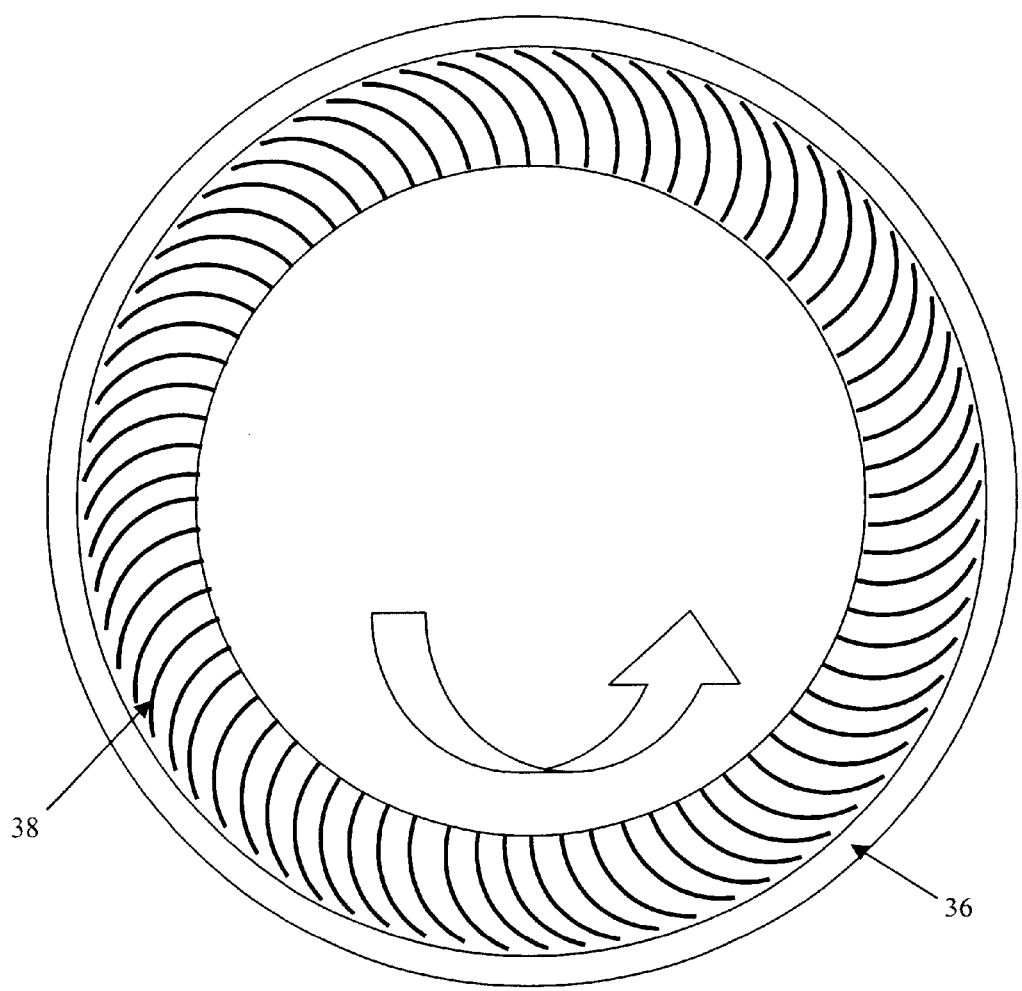
FIG. 4 is a top elevational view of the rotor pump with its circle and blades and indicating the direction of rotation.
Figure 6:
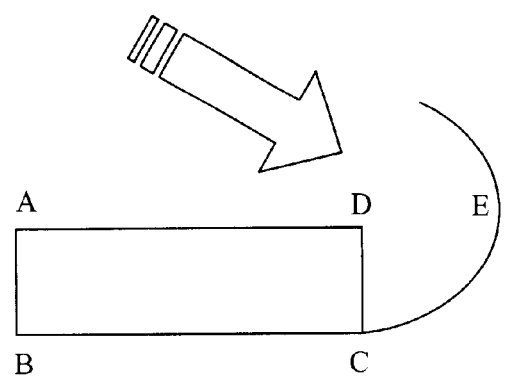
FIG. 6 is a side elevational view of the rotor pump shown in FIGS. 1, 4 and 5.

In FIG. 4 we see that the rotor pump is comprised of a series of Circle Arc Blades (CAB) that resemble a nautilus shell sandwiched between two washer-shaped surfaces. The lower surface is extended beyond the blades on the outer circumference and curves upward past the level of the upper surface, as can be seen in FIG. 6. It continues to curve around until the tangent to the curve is parallel to the nearest part of the shroud. This curved extension of the lower surface is called the outer rim. The outer rim acts like a rain gutter to capture the incoming fluid and feed it into the intake ports of the rotor pump.

Figure 5:
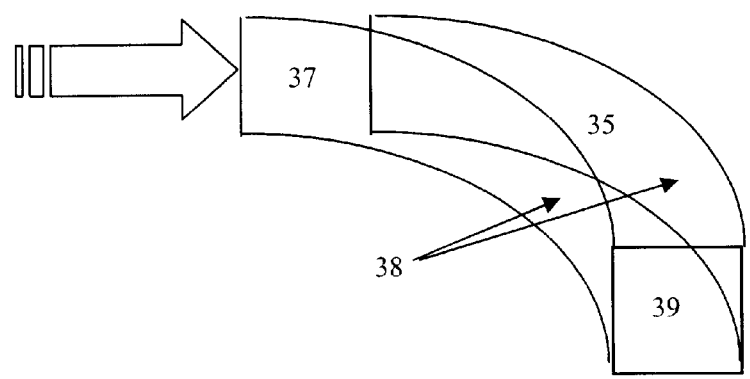
FIG. 5 is a perspective illustration of one of the draft pipes of the rotor pump of the prior Figures.

FIG. 5 shows two adjacent CABs of the rotor pump enclosed by the upper and lower surfaces. This combination of surfaces forms an enclosed draft pipe whose volume gradually increases from the intake port at the outer rim to the exhaust port at the inner circumference. This draft pipe resembles a saber tooth or a tusk. The fluid is drawn into the draft pipe via the intake port and rushes to the Exhaust Port riding the CAB like its going down a water ride in a theme park. The fluid leaves the draft pipe as a vertical sheet along a path that is perpendicular to the inner circumference. It heads directly toward the center of the craft hugging the bottom surface the main body to form a high-pressure area below. This high pressure eventually extends out under the lower surface of the Shroud as well so that the entire lower surface of the craft is resting on a cushion of compressed fluid.

Figure 7:
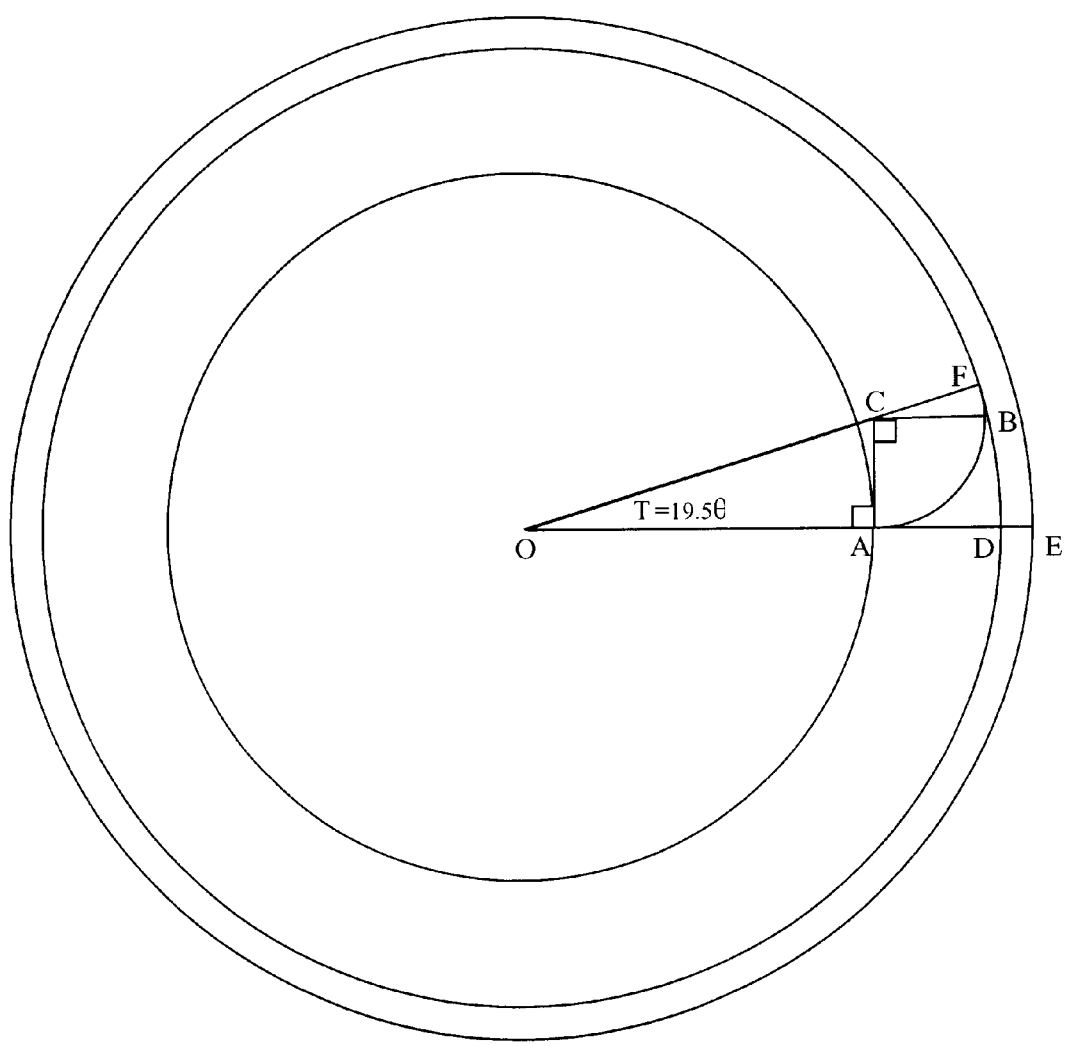
FIG. 7 is a top elevational view similar to FIG. 4 but illustrating how to compute the dimensions of the rotor pump and circle arc blades.

FIG. 7 shows the layout of the rotor pump for a typical circle arc blade. There are three concentric circles with common center 0. The inner circumference is the circle with radius OA. The outer circumference of the upper surface has radius OD. The outer rim lies between the outer circumference and the circle with radius OE.

The circle arc blade (CAB) is the arc AB. If arc AB were extended, it would be tangent to the outer circumference at point F. Note: Maximum power from the rotor pump will be achieved if angle DOF is 19.5 degrees. The center of arc AB is point C. Angles OAC and ACB are both right angles. Rotate this figure say 5 degrees counterclockwise and construct another arc A1B1. Next rotate another 5 degrees and construct arc A2B2. Repeat this process until you once again arrive at the original arc AB. See FIG. 3). Using 5 degrees intervals you will have 72 CABs. A 4 degree interval will yield 90 CABs.

Review FIG. 6 again to see a cross section of the rotor pump. Points A, D and E all correspond to FIG. 7. Line AD represents the edge view of the upper surface and line BC represents the edge view of the lower surface, which is tangentially extended upward and around point E. Area DCE is a cross section of the outer rim. Arc CE is a surface whereas DE is open.

The entire flow of the fluid is as follows. The fluid is circumfused across the entire top surface of the craft and is drawn into the Shroud enclosure via a gap between the main body and the shroud. Once contained within the shroud, it continues to be drawn outward until the outer rim of the rotor pump captures it. From here on it begins its journey to the bottom center of the craft. At the intake port of the draft pipe the circle arc blade is parallel to the flow of the fluid, so there is no resistance. The fluid is drawn into and captured by the draft pipe where it is nudged toward the center of the craft as it approaches the 45-degree point on the circle arc blade. This is where the fluid speed increases dramatically as it is pressed tighter into the blade and is simultaneously compressed from behind with new incoming fluid. Combined with angular momentum, centrifugal force and the draw force of the expanding Draft Pipe, the fluid pressure is spread out evenly over the entire width of the blade. Finally it is hurled out of the Exhaust Port like a stone from a catapult. It exits as a cold, dense vertical sheet that is traveling directly toward the center of the craft at high speed hugging the bottom surface of the main body. The compressed fluid swells downward as it spreads out across the entire bottom surface of the craft providing an even distribution of intense pressure.

If the craft is to be flown under water, a series of cutting blades must be mounted across the outer rim so that they will chop up any seaweed sucked into the shroud. The remains will then flush out through the Draft Pipe like a garbage disposal instead of clogging it up.

Theory of Operation—The three principle features that make the flying saucer unique are as follows. Like a giant water pump, the rotor pump functions to create the high pressure below by taking fluid from the outer rim and compressing it inward to the center of lower surface of the main body. Like a giant vacuum cleaner, the Shroud functions to create the low pressure above by drawing fluid outward from the center of the upper surface of the main body and into the outer rim. The main body is the surface in between sustaining these differences in pressure. This combination of body, power and spirit form a complementary trinity that will let us hover a few feet from the ground or will lift us high into the heavens and beyond.

The entire craft is a wing. The entire craft acts like a jet engine. Unlike a jet engine, however, no fuel is burned for thrust. In fact there is no "thrust" per se, as the fluid is NOT blasted away from the craft like a jet or a rocket or a propeller. The force can best be described as dilation or swelling that endures on by viscosity adhering to the bottom of the craft for a prolonged effect rather than being instantaneously thrust away and thereby requiring vast amounts of energy and fuel to constantly replenish it. The principle goal is to keep the fluid compressed tightly against the bottom surface and pushed inward toward the center in order to maintain a constant high pressure below. The high pressure is evenly distributed across the entire bottom surface for maximum stability. It acts and behaves like a supporting cushion. This high stability is enhanced by the gyroscopic effect of the large spinning rotor pump.

If you stood beneath a flying saucer with its rotor pump in motion, you would not feel a gust of wind like you do standing beneath a helicopter. Rather you would simply sense a force field of higher pressure like the inside of a pressurized cabin on an airplane. It would be safe and it would be silent. There would be no heat and there would be no pollution. The stealth-shaped craft would be hard to detect with radar.

The feature of this flying saucer design over other hovercraft attempts is the attention given to creating a low pressure above the craft with a solid fixed surface between. So much attention is usually given to pushing away from the ground that you overlook the power of a vacuum or near vacuum above. Vacuum is an antigravity tool. The more "nothing" you can put above the craft, the greater the lift. That also is the fallacy of a thrust design. As you direct your thrusting fluid away, a vacuum is left in its wake to counteract the thrust. This is why so many hovercrafts have ground effect. Lift is a ratio of high pressure below to low pressure above. If the denominator goes to zero, i.e. pressure above approaches a vacuum, the lift force goes to infinity. This translates to unlimited payload.

In contrast to the long, narrow wing of conventional aircraft, the flying saucer is circular in order to maximize the surface area between the high and low-pressure volumes. The craft moves perpendicular to this surface. It is repelled away from the high-pressure area below and is drawn up into the low-pressure area above, as it works in harmony with the forces of nature. It creates its own high-density surface to float on. By varying the relative pressures above and below, you determine the height of that surface so that it floats like a cloud, thereby utilizing the principles of antigravity. As it moves forward, the hole it leaves is filled with the compressed fluid from above to eliminate drag, just as a mole pulls dirt around its body and pushes it behind as it moves through the soil. There will be no sonic boom when it exceeds the speed of sound since the fluid is not forced apart and then slapped together. Both resistance and drag are minimized. For this reason acceleration is instantaneous and dramatic.

Observe how the sail of a sailboat gets its massive force. The sail is also a surface separating a low pressure from a high pressure with direction of motion perpendicular to the surface. The formulas used for computing wind forces of a sailboat can be directly applied to the flying saucer since they both operate on the same principle. The only difference is that the sailboat relies on nature to control the speed and direction of the wind, whereas the flying saucer creates its own wind. You get the power of the sail without the water resistance of the hull as you float on a magic carpet of compressed air. You simply cut a hole in the sky and fall upward into the hole. You clear the path ahead, get sucked into the vacuum and then fill the hole behind.

Incidentally, this is one aircraft that does not require wind tunnel testing because there is no airfoil involved and also because the flying saucer makes it own wind. A better testing environment would be underwater. The ship will move just as easily under water as it does in air, and it will easily go from air to water and back again. The density of the ambient fluid doesn't matter just as long as the fluid can be drawn into the peripheral Shroud and expelled by the rotor pump. For this reason it is theoretically possible that the ship could even propagate in outer space by sifting the small particles within space just as it sifts the small particles of air in the atmosphere. Relative densities of fluid above and below the ship could yield the same pressure ratios obtained in air, ratios necessary to achieve unparalleled velocities and accelerations that are mandatory to make interstellar space exploration practical. A trip to the moon might be measured in hours, a journey to Mars in days. All this can be done without venting precious fuel into space, while simultaneously generating electricity for power as well as for converting into water and oxygen. As the ship reenters the atmosphere it will not require a heat shield, since it will be pulling the outer atmosphere around itself instead of pushing its way through and creating friction.

Right-handed or Left-handed—The rotor pump is either right-handed or left-handed. FIG. 4 illustrates a left-handed rotor pump. If a toy flying saucer were made using the rotor pump and shroud design and if the main body were a flat surface that turned with the rotor, the flying saucer would be thrown with your left hand so that it spins in a counter-clockwise direction to make it fly. If the blades were reversed, you would throw it with your right hand to have it spin in a clockwise direction. This reversal could also be accomplished by merely flipping it over, but the lifting force is always greater if the air leaves on the exhaust port side of the draft pipe where it is moving directly toward the center of the main body. One potential problem with the toy version is that its angular momentum may not experience entropy and would either hover or fly forever. By creating a vacuum above and a ball-bearing-like cushion of air across the entire bottom surface, there may not be enough air resistance and drag to cause it to slow down and stop spinning. According to Newton's first law of motion, no equal and opposite force means no inertial entropy.

G-forces—Before the captain gives the order to take us to warp speed, he may want to evaluate the effect that the maneuver will have on himself and the crew. If a pilot blacks out at nine Gs, how can he possibly survive an acceleration rate many times that. The answer to that dilemma may be a natural extension of the way the flying saucer is powered. All conventional transportation vehicles push their way through the air or water. This causes the fluid in front to be compressed. The increased pressure is then transferred to the air within by convection. In contrast the flying saucer is pulled through the air. Will the low pressure in front of the craft have any effect on the air within? Will it tend to neutralize the pressure much like two waves 180 degrees out of phase cancel each other out? If it does not, then the advantage of the flying saucer to perform unprecedented accelerations due to reduced resistance and drag will not be able to be exercised since it would endanger the lives of the crew. If it does, then we are one step closer to warp speed. At this time we can only speculate. Only time will tell.

CFR and Variables for the Rotor Pump—The efficiency of the rotor pump is to be measured in CFR, which stands for cubic feet per revolution. This ratio is computed by dividing CFM by RPM. CFR is a gauge to measure the combined effects of the following variables:

Inner Radius (Determines the maximum size of the main body).

Number of CABs (which also determines the width and possibly height of the draft pipe).

Aspect Ratio (Determines the width of rotor pump, the size, placement and orientation of the CAB, the size and shape of the shroud, and the overall appearance of the craft). Optimum angle is 19.5 degrees.

Height of the Rotor Pump (note: Optimum shape of the Exhaust Port is a square).

Shuttle—Could the flying saucer become the next Space Shuttle?

Advantages:

Unlimited payload.

No booster rockets required.

No refueling needed. Efficient. Affordable to the average citizen.

Take off and land from any airport.

Turn around time measured in hours, not weeks.

No noise or air pollution.

No size restriction. This airbus could be as big as a warehouse.

Minimum moving parts for low maintenance.

Minimum travel time.

No heat shield required for reentry.

If flown to the moon or to other planets, it would be a relocatable base station/research center/factory that you build totally intact on earth, test in orbit, then streak to its destination or back.

Motor Drive System—We will now discuss how the rotor pump is supported and driven. The main goals needed to complete the power system are as follows:

1. To have the rotor pump turn with as little friction as possible.
2. To avoid using a centralized drive shaft, which produces the reverse body torque that has plagued helicopter design for nearly a century.
3. To have a means for steering the craft.
4. To have multiple motor/generators for redundancy, load balance and electricity generation.

Figure 8:
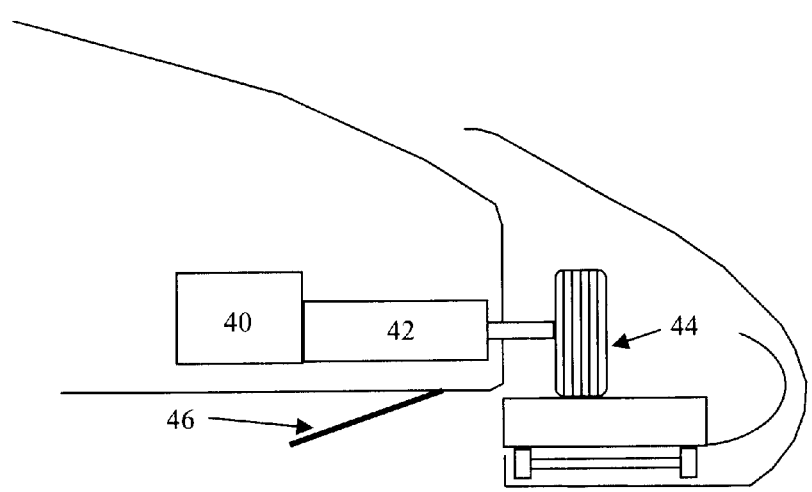
FIG. 8 is a cross sectional view similar to FIG. 6 but illustrating the drive mechanisms for the draft pipes of the prior Figures.

In FIG. 8 the rotor pump is shown supported by and rolling on a set of casters or rollers below. The speed that those casters would have to turn and the environmental extremes that are possible for the flying saucer would make this a poor choice for a production model, but they would suffice for a prototype version. Ideally the rotor pump would float on a magnetic field in order to minimize any rotational friction.

Since the rotor pump is contained within the shroud and since there will be a very low pressure within the shroud, then as the RPM of the rotor pump increases it will be lifted up off the casters by this low pressure and pressed firmly into the set of drive wheels. The lower set of casters is there for the rotor pump to rest upon until it is sucked up away from them. Subsequent designs will eliminate them altogether.

Unlike a helicopter whose main rotor is driven by a drive shaft that is vertical and centralized, the drive shaft of the flying saucer is horizontal, radial to the rotor pump, and offset to the outside of the craft. This means that as the drive shaft turns, the body of the craft does not turn in the opposite direction, and consequently no tail rotor is needed to counteract the torque.

The helicopter's main rotor is both a wing and a propeller. This is why it so inefficient. The rotor's wing is long and narrow, which minimizes the surface area. It doesn't have a solid surface separating the high and low pressures. It is more efficient to separate these two functions as is done with a fixed wing aircraft. The fixed surface between the high and low pressures should be different than the propeller moving the air. Many carnival rides are driven by a motor whose drive shaft has a tire mounted to transfer power to the ride. This is the means by which the rotor pump is driven as illustrated in FIG. 8. The tire could be replaced by a gear mechanism. The rotor pump could also be driven by electromagnetic monorail propulsion.

To steer the craft a series of spoiler flap control surfaces are located along the circumference of the bottom surface of the main body. These control surfaces deflect the air downward just as it leaves the exhaust port of the rotor pump. This reduces the lift on that side of the craft and it drops downward accordingly.

Figure 9:
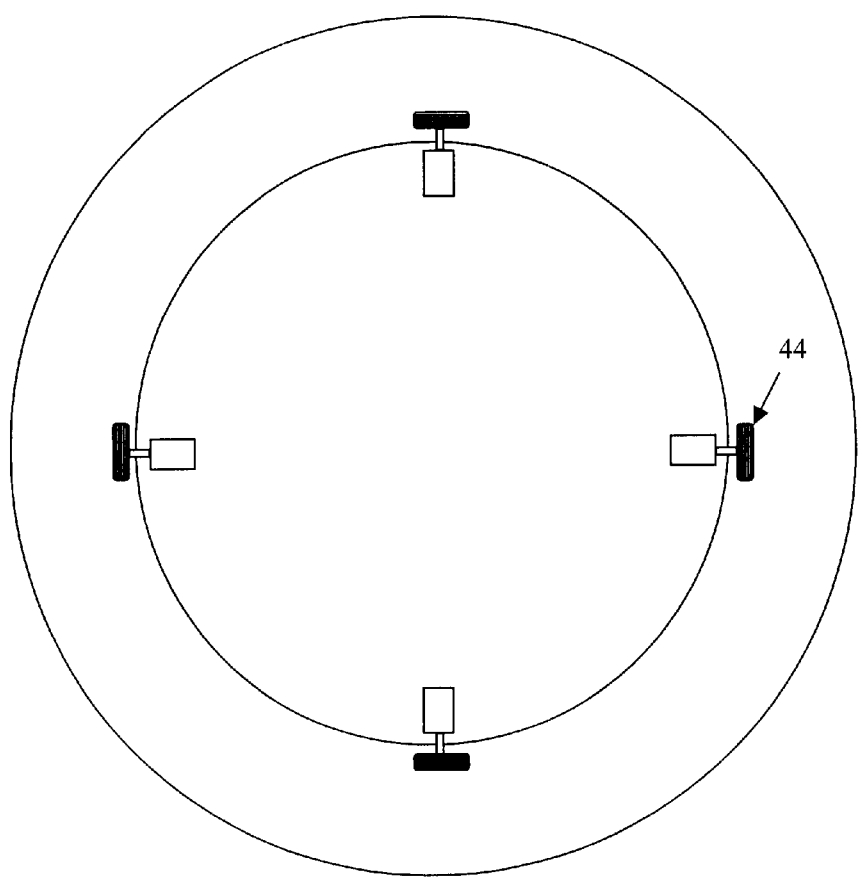
FIG. 9 is a plan view of the system of the prior Figures but illustrating the plurality of drive mechanisms for the rotary pump.

FIG. 9 shows four motors and drive wheels positioned at equal intervals around the circumference of the main body. Larger craft would have many more pairs of drive or idler wheels. For load balance each motor must be paired with another one of equal mass on the opposite side of the craft. In reality only one motorcycle engine may be needed to turn the rotor pump. The other motor would serve as a backup and would be disengaged until needed by either raising the drive wheel above the rotor pump or by placing the transmission in neutral.

The other units would be electric motor/generators or flywheels. They would tap some of the inertial energy from the rotor pump to generate electricity the same way it is done in an automobile. If enough excess electricity is generated, some of it could be fed back to another electric motor/generator, which would in turn act as a motor to assist in turning the rotor pump thereby saving fuel. The larger the craft, the more motor/generators could be installed. This means of transportation will be efficient and economical. This characteristic is essential for deep space travel.

Sound—What sound would the rotor pump emit? On the following page is a table depicting the tone that would be generated by the rotor pump for a specified RPM and a given number of CABs. For example, to generate the tone middle c which is 256 Hz, a 360 CAB rotor pump would have to rotate at 43 RPM, whereas a 72 CAB rotor pump would require 213 RPM.

Our audible range is limited, and sound must radiate outward to be heard. But by design the fluid emitted from the exhaust port is compressed inward against the other fluid, so any sound would be muffled at best. Furthermore the top of the craft is enveloped in a near vacuum, and sound doesn't travel in a vacuum. For these reasons it is anticipated that no sound would be emitted.

| Octave | Tone | No of CABs: Hz | 360 RPM | 180 RPM | 120 RPM | 90 RPM | 72 RPM |
|---|---|---|---|---|---|---|---|
| c' | c | 256 | 43 | 85 | 128 | 171 | 213 |

Other Applications of the Basic Principle

Figure 10:
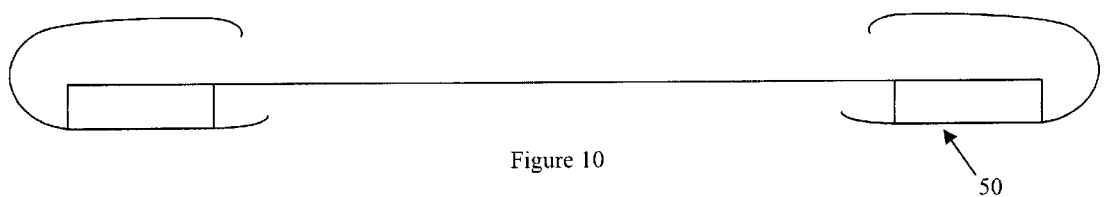
FIG. 10 is a side elevational view similar to FIG. 2 but illustrating an alternate embodiment of the invention wherein the device is configured for use as a toy.

Saucer Toy—In FIG. 10 an alternate embodiment of the invention is show. In this embodiment the rotor pump is attached to the outer housing to thereby constitute a toy 50.

Figure 11:
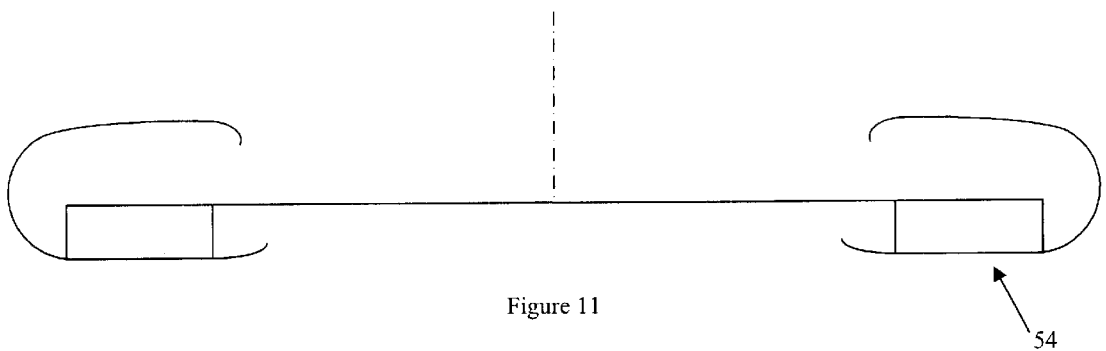
FIG. 11 is a cross sectional view similar to FIG. 2 but illustrating an alternate embodiment of the invention wherein the device is configured as a saucer prop.

Saucer Prop—Another alternate embodiment of the invention is shown in FIG. 11. In this embodiment the rotor pump is attached to the outer housing to thereby constitute a propeller with a central axial shaft to effect rotational movement. Substitute the combination of rotor pump, surface and shroud for the propeller of a boat, ship or submarine and you will have a more powerful driving force for racing through the water while using less fuel. The only wake or turbulence will be caused by the boat's hull. The powerful force will be silent and no bubbles will be generated. In this application the rotor pump, surface and shroud would all turn together and be driven by a conventional central drive shaft for ease in retrofitting. Simply replace the old prop with a saucer prop.

Figure 12:
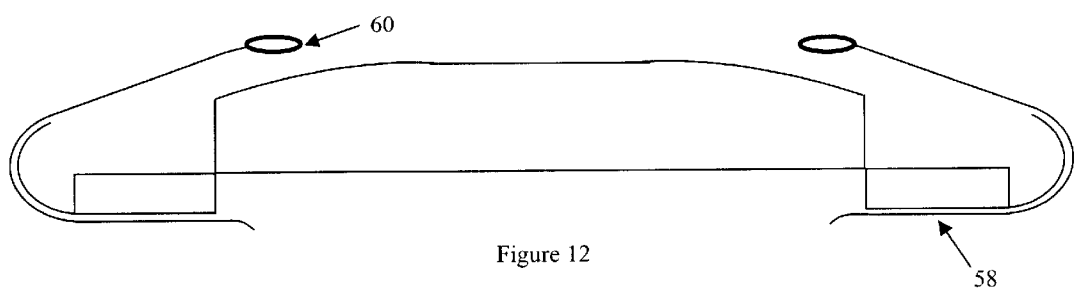
FIG. 12 is a cross sectional view similar to FIG. 2 but illustrating an alternate embodiment of the invention wherein the system is configured as a suction saucer.

Suction Saucer—A further alternate embodiment is shown in FIG. 12. In this embodiment, an elastomeric lip 60 is provided around the input edge of the exterior housing to constitute a suction propeller 58. People who work with plate glass have a tool that makes handling the glass easier and safer. This tool is a suction clamp. The soft rubber cups of the suction clamp are pressed against the plate glass where they form a vacuum seal with the surface of the glass. The glass can be picked up and manipulated using the handle of the suction clamp. To release the clamp, a lever is pulled that breaks the vacuum seal and the glass is released.

A suction saucer is a modified flying saucer built so that the top surface of the main body does not extend above the Shroud. Cover the upper circular edge of the Shroud with soft rubber enclosed in leather. Place this cushioned leather edge against a flat surface and turn the rotor pump to create a vacuum seal. If the suction saucer were attached to a flying saucer, it could be used in construction for moving heavy loads of material especially in building skyscrapers. To release the load simply activate a pressure relief valve in the main body. Incidentally, it could easily transport large stone slabs many miles for pyramid construction.

A suction saucer could also assist unloading cargo from a ship. With a flying saucer/suction saucer unit, the ship could even be unloaded without coming into port. A fleet of these units could bucket brigade the cargo to shore while the ship is still en route for nonstop shipping. A relief crew, supplies, new cargo and fuel could be flown out to the ship via a flying saucer.

Figure 13:
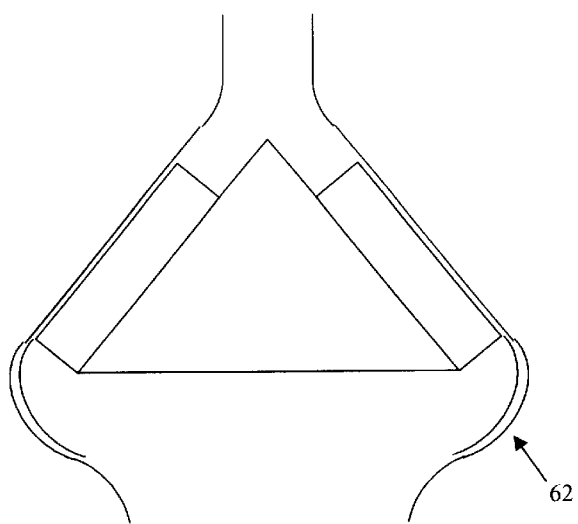
FIG. 13 is a cross sectional view similar to FIG. 2 but with the draft pipes positioned in an angular orientation so that the rotary pump assumes a frusto-conical configuration.

Frusto-Conical Enhancement—Another embodiment of the invention is shown in FIG. 13. In this embodiment, the rotor pump is rotatably coupled to the outer housing in a frusto-conical configuration 62. In this aspect, a high aspect ratio rotor pump is molded onto the surface of the cone and encased in a shroud. When the cone is spun on its axis, a powerful, highly focused beam of air, or water, will be generated. This force may be used for a fire hose or else to impel a projectile.

Figure 14:
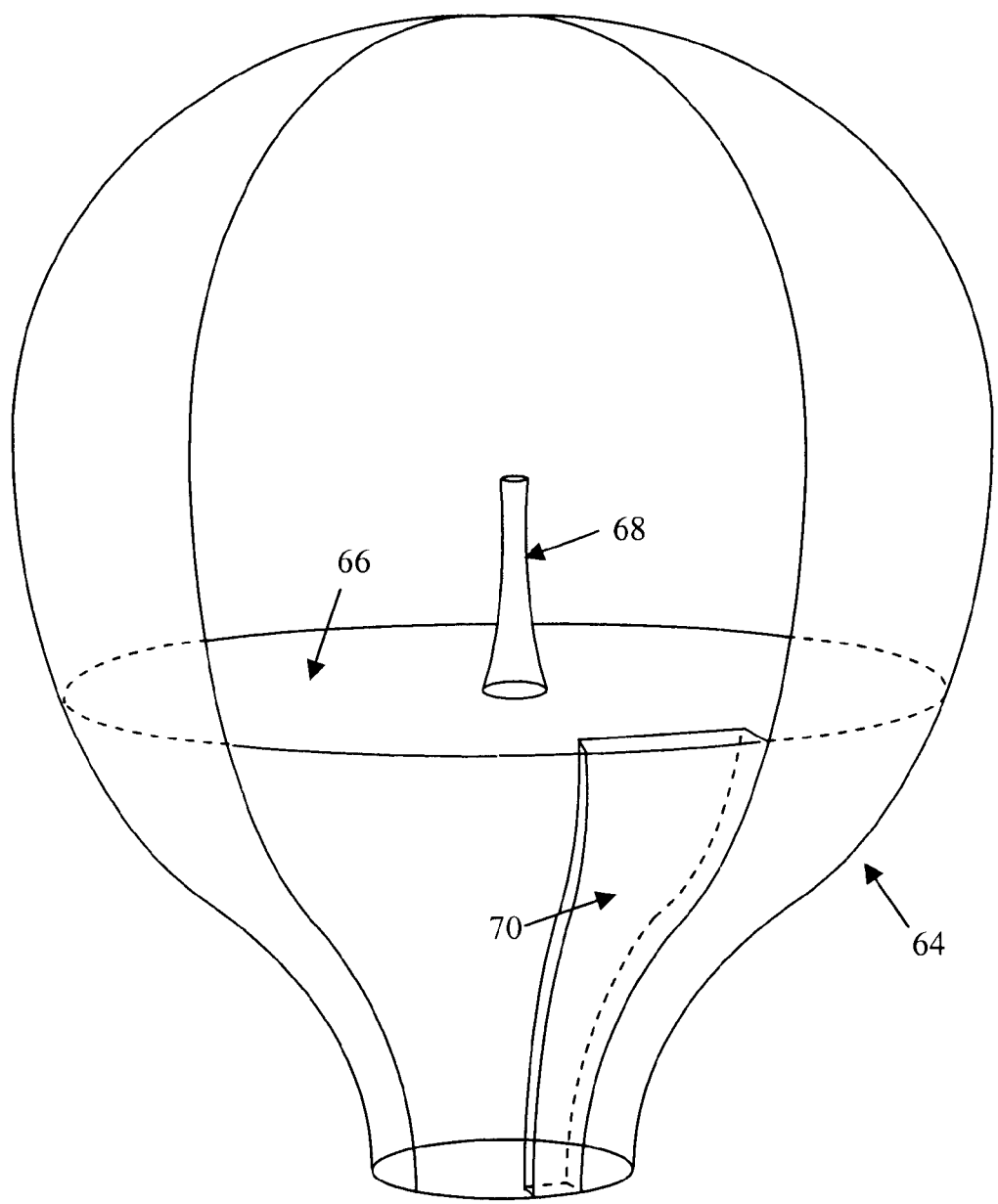
FIG. 14 is a perspective illustration of an alternate embodiment of the invention wherein the device is configured as a hot air balloon.

Hot Air Balloon Enhancement—A final embodiment of the invention is shown in FIG. 14. This embodiment includes a balloon 64 with an interior circular plate 66 with an axial Venturi 68 and a draft pipe 38 constituting a pocket 70 extending from the circular surface to the bottom of the balloon. The hot air balloon works on the same principle of antigravity as the flying saucer but uses heat instead of the rotor pump. A surface separates the high pressure of the hot air within from the low pressure of the cooler air without. When it does so, the balloon gently lifts off the ground against the force of gravity without using an airfoil and without reaching escape velocity. It will continue to rise until its density matches the density of the surrounding air. From then on it will move horizontally drawn toward pockets of low pressure. The flying saucer does not have that limitation. It has the advantage of being able to increase the speed of the rotor pump thereby increasing the pressure below to climb even higher. More importantly it also has the advantage of being able to lower the pressure above by simultaneously drawing huge amounts of air away from the top surface.

The balloon has a rather large hole on the bottom where some of the hot air escapes. So the torch must keep burning fuel to maintain the high temperature and pressure in order to sustain flight. However, there is a way to passively maintain the high temperature and pressure using less fuel. Inside the balloon about one-third the way up from the bottom sew another horizontal surface and leave a small six-inch diameter hole in the middle of that surface. The hot air from below would rise up through that hole and increase the pressure in the upper two-thirds of the balloon. The additional surface would help keep the hot air from escaping. The balloon would act like a pressure cooker passively retaining the higher pressure longer and consuming less energy. The balloon would attain higher altitudes due to the higher pressure and the flight time would increase dramatically.

Antigravity is a density problem, not an acceleration problem. You don't need escape velocity to get lift. It so happens that the earth too is a surface with high pressure within and low pressure without.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A power generation system for flying in a saucer shaped device through the use of a rotary pump comprising, in combination:

an internal housing of a generally cylindrical configuration with a top portion and a bottom portion and a peripheral sidewall there between, the internal housing being adapted to carry cargo and passengers;

an external housing of a generally torus shape coupled to and receiving the internal housing and having an upper lip and a lower lip and a smooth outer edge, the upper lip being spaced from the internal housing to allow the flow of air into the external housing, the lower lip having a plurality of bearings spaced equally there around and adapted to facilitate the expulsion of air from the external housing in a radial direction;

a rotary pump comprising an upper washer, a lower washer with a plurality of fins there between with the upper washer forming a top surface and the lower washer being a bottom surface adapted to rotatably rest upon the bearings of the external housing, the fins being coupled perpendicular to both the upper and lower washers with each fin being curved from the center such that when rotated the rotary pump draws air into the external housing from the upper lip and pushes it past the lower lip and out of the external housing to lift the system;

a plurality of driving mechanisms being positioned around the peripheral sidewall of the internal housing, each driving mechanism including a motor and wheel assembly with the wheel assembly extending into the external housing such that the wheel contacts the top surface of the rotary pump providing rotary propulsion to the rotary pump; and a plurality of wind directing baffles coupled to the internal housing and adapted to control the direction of air flow.

2. A power generation system comprising:

an internal housing of a generally cylindrical configuration with a top portion and a bottom portion and a peripheral sidewall there between;

an external housing of a generally torus shape coupled to and receiving the internal housing and having an upper lip and a lower lip and a smooth outer edge, the upper lip being spaced from the internal housing to allow the flow of air into the external housing; and a rotary pump comprising an upper washer, a lower washer with a plurality of fins there between with the upper washer forming a top surface and the lower washer being a bottom surface, the fins being coupled perpendicular to both the upper and lower washers with each fin being curved such that when rotated the rotary pump draws air into the external housing from the upper lip and pushes it past the lower lip and out of the external housing to lift the system.

3. The system as set forth in claim 2 and further including:

a plurality of driving mechanisms being positioned around the peripheral sidewall of the internal housing, each driving mechanism including a motor and wheel assembly with the assembly extending into the external housing such that the wheel contacts the top surface of the rotary pump providing rotary propulsion to the rotary pump; and a plurality of wind directing baffles coupled to the internal housing and adapted to control the direction of air flow.

4. The system as set forth in claim 2 wherein the rotor pump is attached to the outer housing to thereby constitute a toy.

5. The system as set forth in claim 2 wherein the rotor pump is attached to the outer housing to thereby constitute a propeller with a central axial shaft to effect rotational movement.

6. The system as set forth in claim 2 and further including an elastomeric lip around the input edge of the exterior housing to constitute a suction propeller.

7. The system as set forth in claim 2 wherein the rotor pump is rotatably coupled to the outer housing in a frusto-conical configuration.

8. The system as set forth in claim 2 and further including a balloon with an interior circular plate with an axial Venturi and a draft pipe constituting a pocket extending from the circular surface to the bottom of the balloon.

\* \* \* \* \*